Sept. 1, 1925.
B. D. CHAMBERLIN
1,551,935
APPARATUS FOR GATHERING GLASS AND THE TREATMENT THEREOF ON BLOWPIPES
Filed April 23, 1909 8 Sheets-Sheet 1
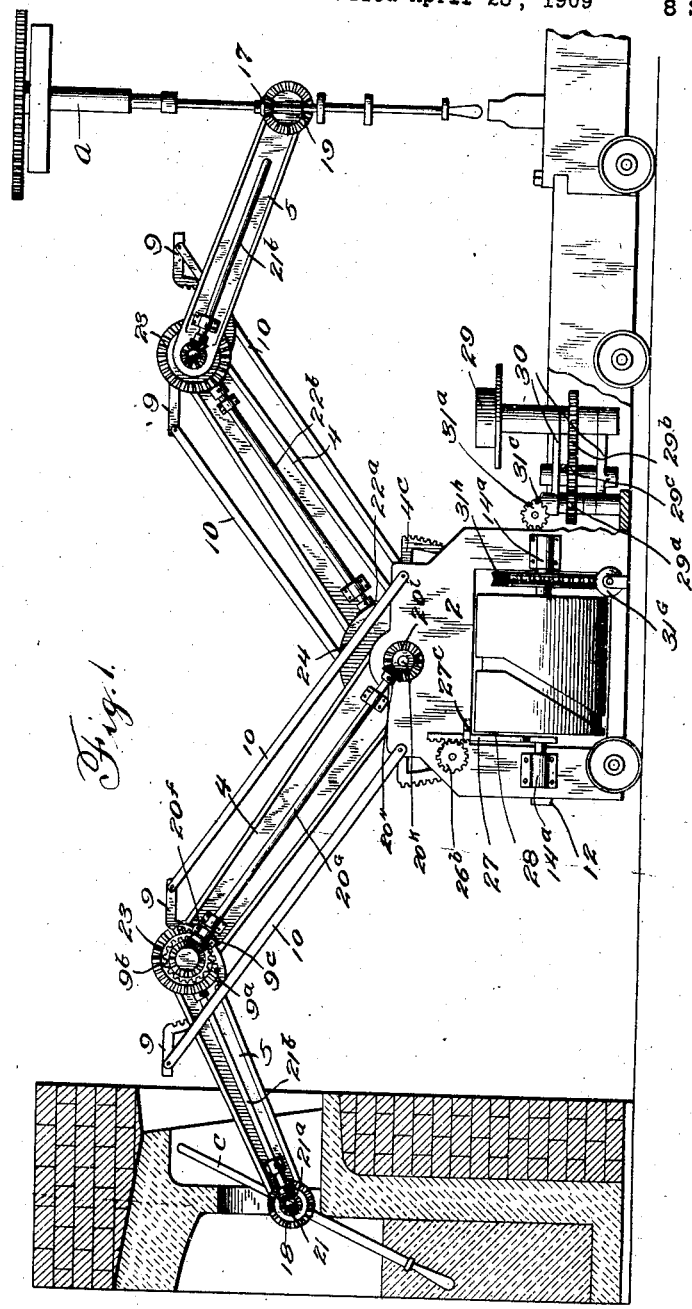

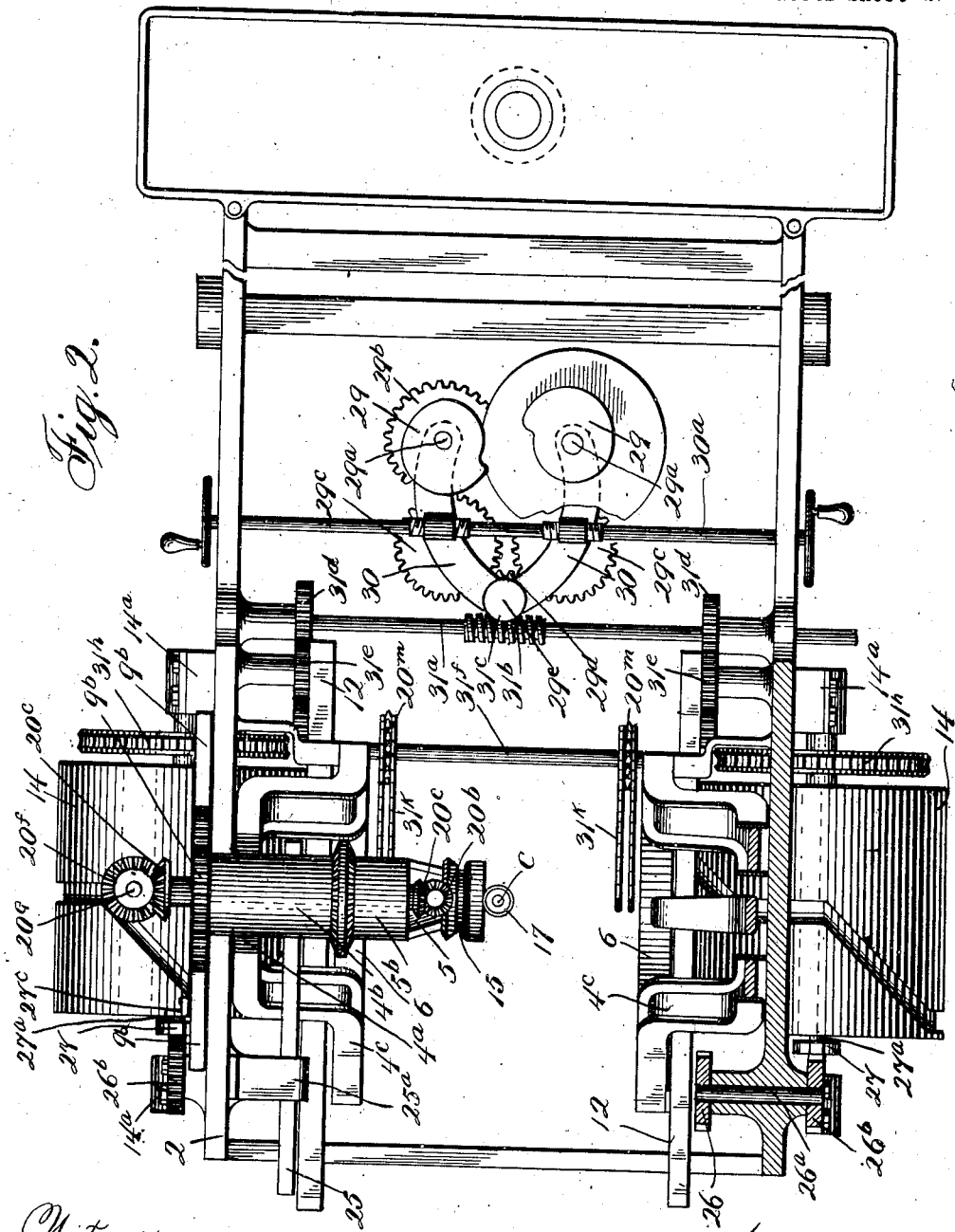

Sept. 1, 1925.
B. D. CHAMBERLIN
1,551,935
APPARATUS FOR GATHERING GLASS AND THE TREATMENT THEREOF ON BLOWPIPES
Filed April 23, 1909   8 Sheets-Sheet 3
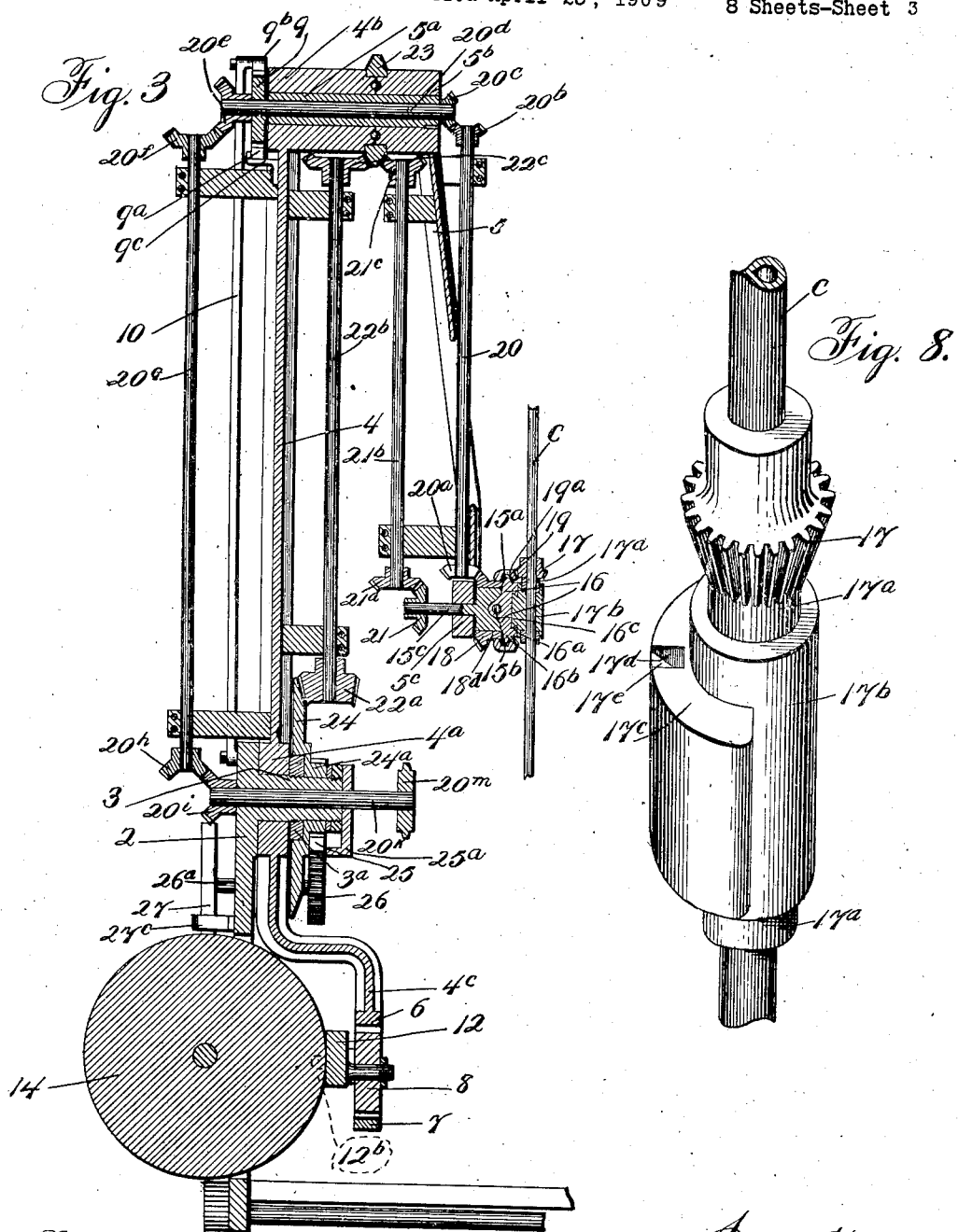

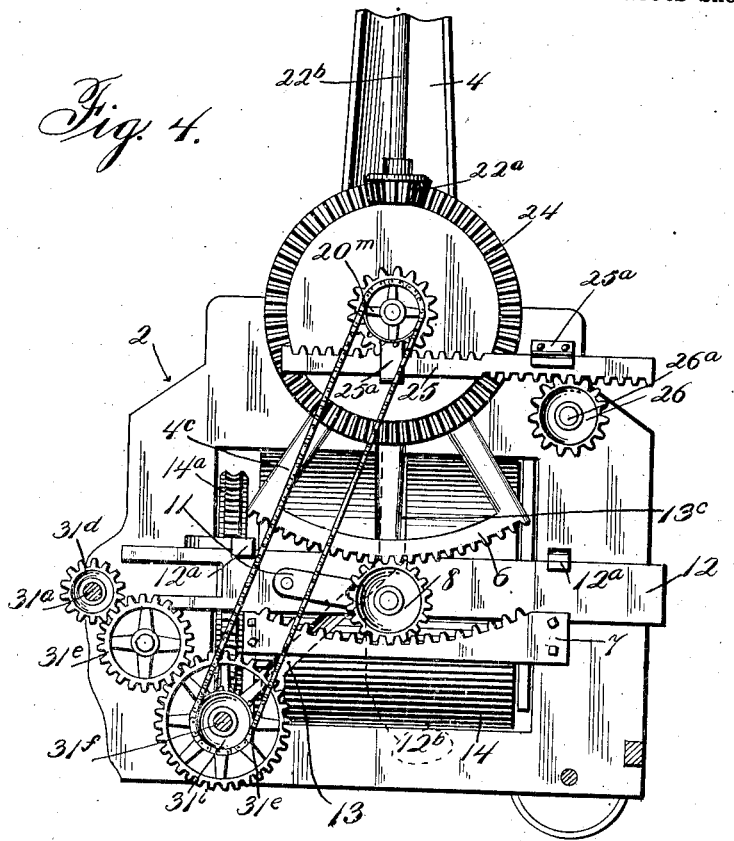
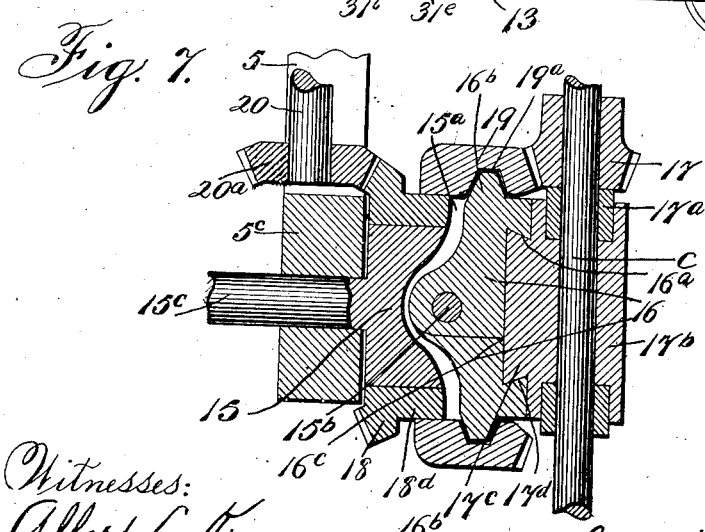

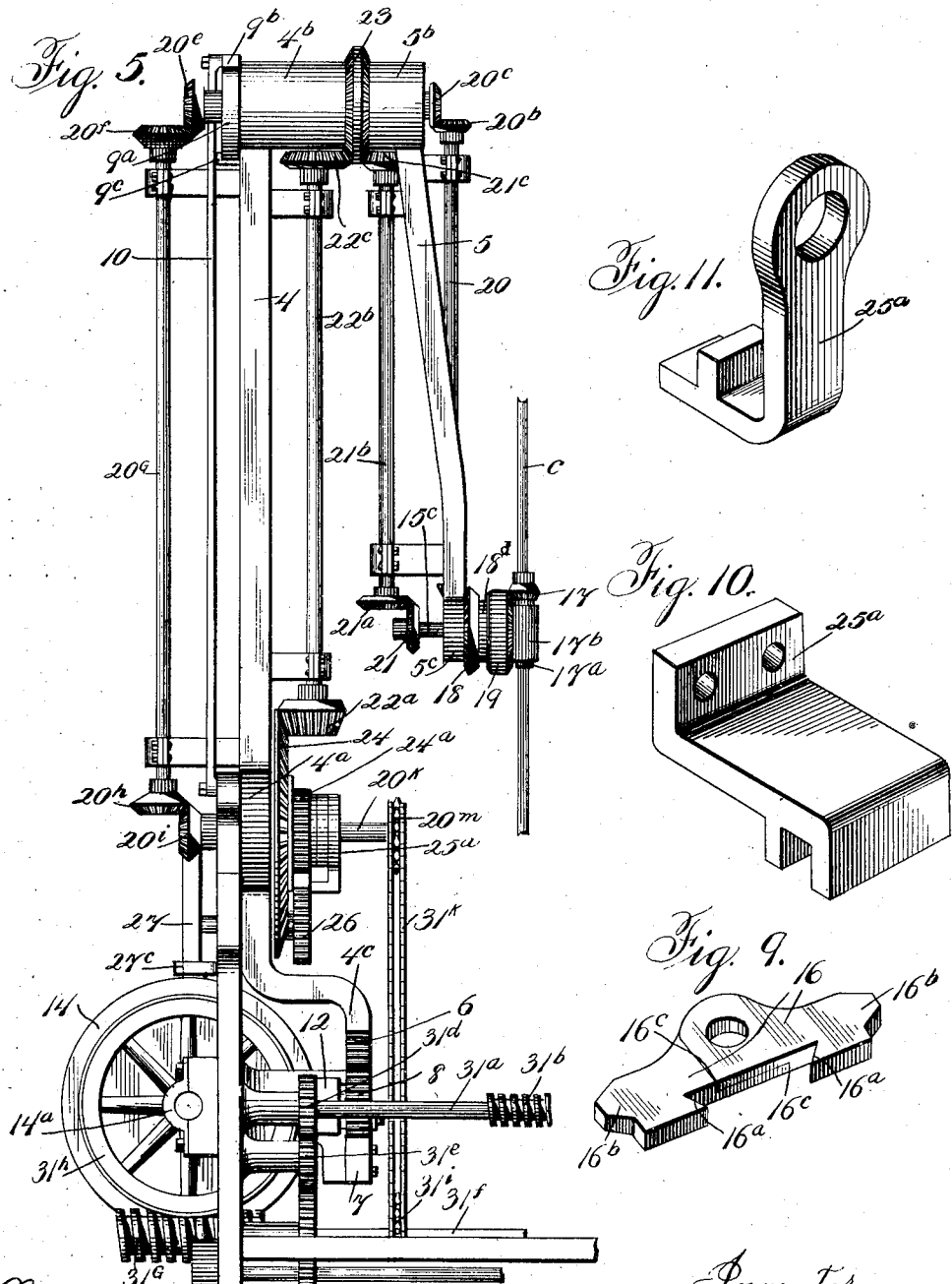

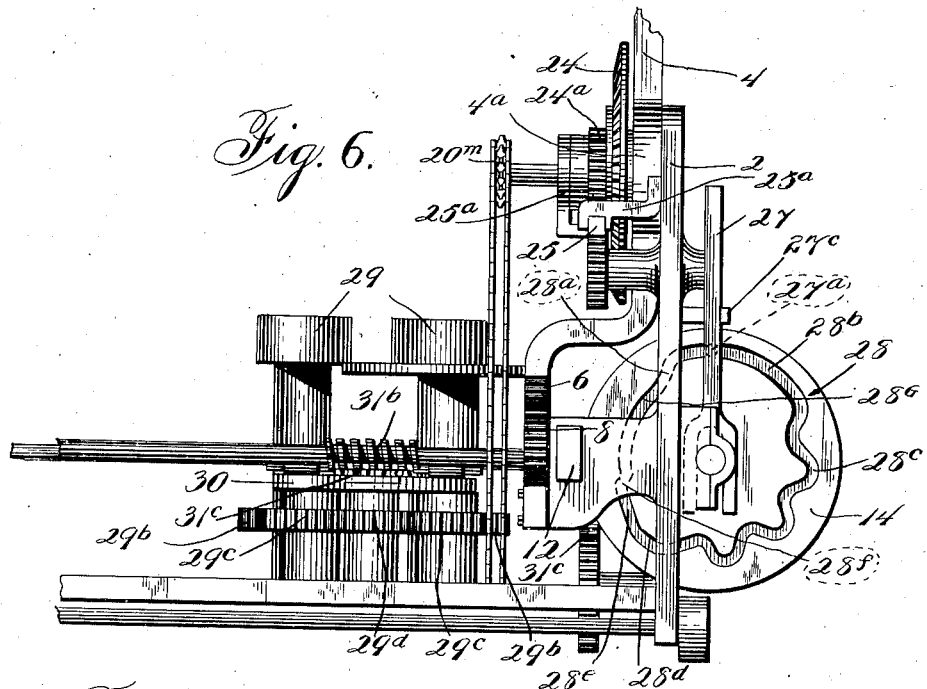
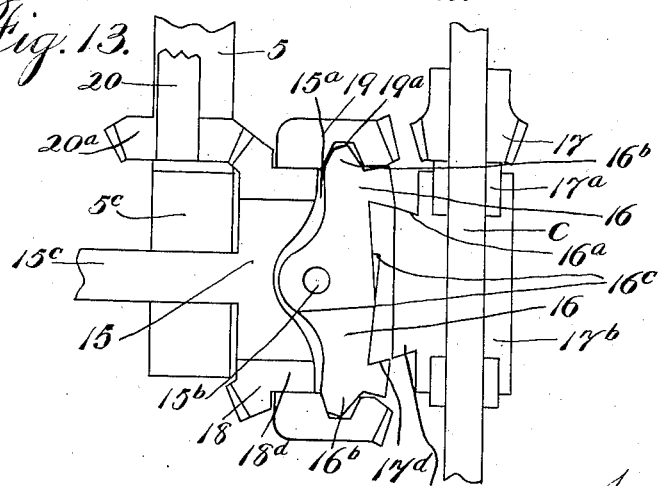

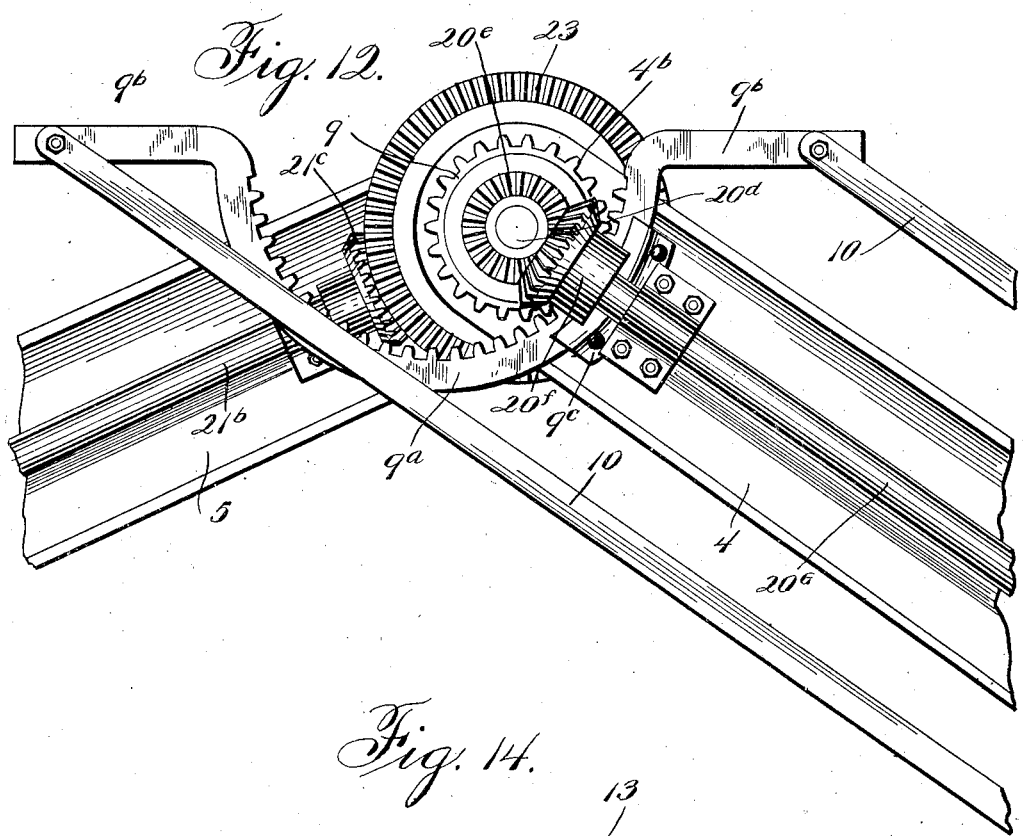
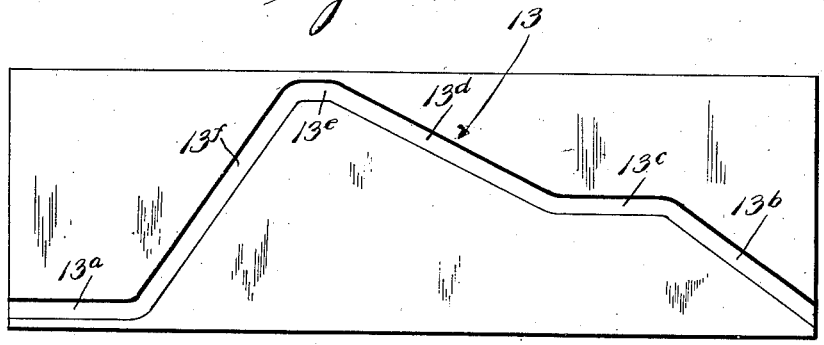

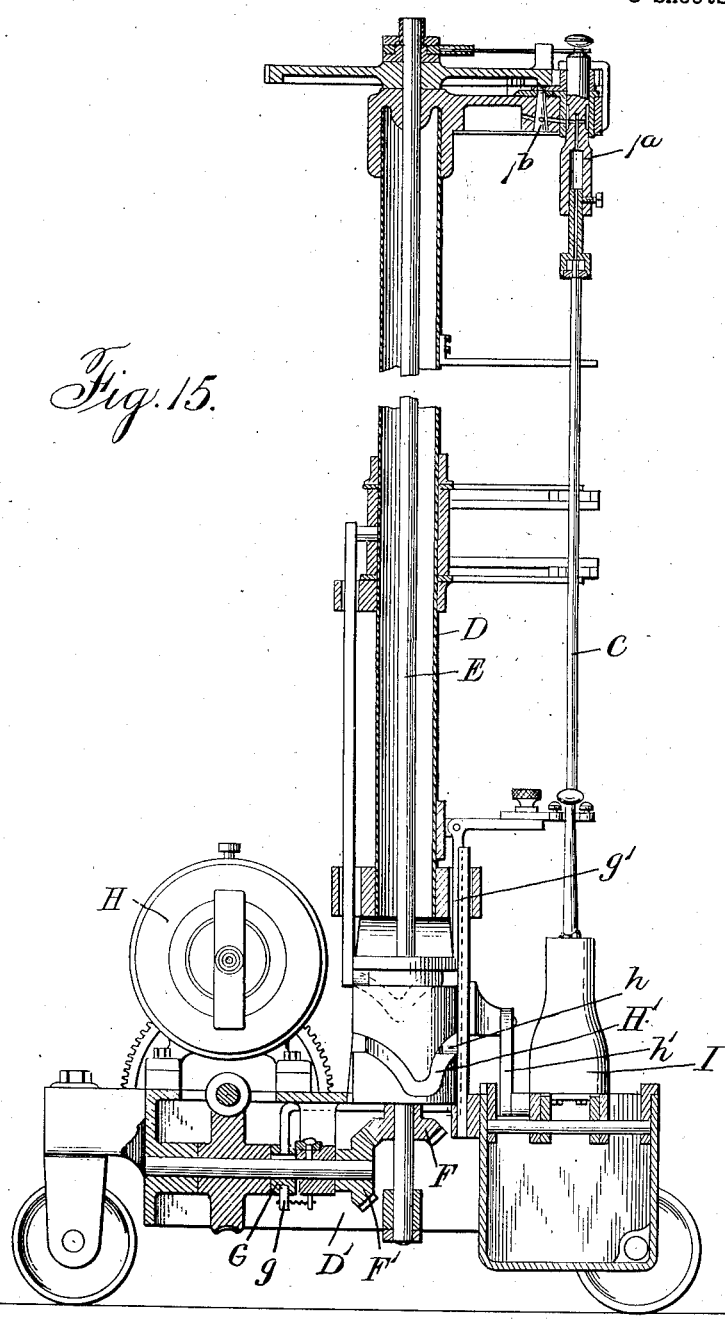

Patented Sept. 1, 1925.

1,551,935

UNITED STATES PATENT OFFICE.

BENJAMIN D. CHAMBERLIN, OF WASHINGTON, DISTRICT OF COLUMBIA, ASSIGNOR, BY MESNE ASSIGNMENTS, TO HARTFORD-EMPIRE COMPANY, OF HARTFORD, CONNECTICUT, A CORPORATION OF DELAWARE.

APPARATUS FOR GATHERING GLASS AND THE TREATMENT THEREOF ON BLOWPIPES.

Application filed April 23, 1909. Serial No. 491,812.

*To all whom it may concern:*

Be it known that I, BENJAMIN D. CHAMBERLIN, a citizen of the United States of America, and a resident of Washington, District of Columbia, have invented certain new and useful Improvements in Apparatus for Gathering Glass and the Treatment Thereof on Blowpipes, of which the following is a specification.

This invention has for its object to perform by machinery all manipulations of the blow-pipe iron, now generally performed by hand, from and including the time the same is inserted in the pot to gather the glass thereon to and including the time the blow-pipe with the glass thereon is placed in position to be enclosed within the mold, the operations to be performed including the insertion of the blow-pipe within the pot of glass, the gathering of the glass thereon by suitable rotation of the blow-pipe, the marvering of the glass and the swinging and rotation of the blow-pipe and the positioning of the blow-pipe in respect to the mold, inasmuch as the machine which I herein describe is adapted in positioning the blow-pipe to deliver the same to the blowing machine forming the subject matter of my other application S. N. 445,252, Fd. July 24, 1908, and renewed October 29, 1910, as Serial No. 589,786, this invention may be said to include means for automatically gathering, marvering and swinging and blowing glass articles on the end of a blow-pipe without the intervention of manual actions between the successive operations.

For these purposes it embodies a mechanism adapted to receive a blow-pipe, a marverer and mechanism for effecting such movement of the blow-pipe receiver as will present the blow-pipe to the molten glass in the pot; as will withdraw the blow-pipe from the pot and present it, with glass thereon, to the marverer; as will swing the blow-pipe, for the purpose of elongating and shaping the article upon the blow-pipe, and as will present the blow-pipe to the mechanism adapted to finish the blowing operation, the parts having such intermittent action as the necessities of the adopted construction may require.

Referring to the accompanying drawings, in which corresponding parts are designated by corresponding marks of reference:—

Fig. 1 is a side elevation of a complete machine constructed in accordance with this invention.

Fig. 2 is a half plan and half section of the machine shown in Fig. 1.

Fig. 3 is a vertical section through one-half of the center of the machine (the arms being shown in an upright position for the purpose of illustration) taken on lines $X^3$ to $X^3$ of Fig. 1 and on an enlarged scale.

Fig. 4 is a fragmental longitudinal section taken on the center line of the machine, the parts being in the position shown in Fig. 3.

Fig. 5 is a fragmental end elevation of one-half of the machine.

Fig. 6 is a fragmental end elevation taken from the opposite end of the machine to Fig. 5.

Fig. 7 is a central view of the blow-pipe chuck.

Fig. 8 is a perspective view of the blow-pipe adapted to be used in this machine.

Fig. 9 is a perspective view of the chuck arms.

Figs. 10 and 11 are perspective views of bearing brackets.

Fig. 12 is an enlarged detailed elevation of the mechanism for moving the outer arm upon the radius arm.

Fig. 13 is a view illustrating diagrammatically the action of the chuck showing it in its open position.

Fig. 14 is a development of the drum showing the peripheral-cam grooves.

Figure 15 is a vertical section through the blowing and molding mechanism which is shown diagrammatically in Figure 1.

In the precise construction of the machine shown herein, the blow-pipe is presented manually to the blow-pipe receiving device or chuck and mechanism is provided for effecting a translating movement of the chuck towards the furnace or pot, away from the furnace and to the blow position and a return of the chuck towards the pot, the blow-pipe being removed from the chuck during the time it is presented at its blowing position.

Mechanism is further provided for rotating the blow-pipe within the chuck and mechanism is also provided for swinging the blow-pipe around the center of the chuck for the purpose of elongating and shaping the bulb and properly presenting it to the various instrumentalities with which the blow-pipe coacts, this last named mechanism being adapted to handle the blow-pipe within the pot or furnace opening, to move it in a vertical plane, so that gathered glass is presented to the marvering device and to swing it upon the vertical plane axis for the purpose of elongating and shaping the gathered glass and finally to present it at the blowing position. The swinging mechanism for the blow-pipe as well as the traversing mechanism for the blow-pipe chuck are intermittent in their action in that they have positions of rest corresponding to the gathering and blowing positions and to a position (marvering) intermediate thereof. It further embodies suitable marvering mechanism and means whereby the several mechanisms above referred to are brought into and maintained in synchronism with each other and are caused to properly and successively perform the operations for which they are designed.

The base of the machine comprises a suitable wheeled frame 1 adapted to be secured in a fixed position in respect to a blowing mechanism A of the general character described in my other application S. N. 589,786 hereinbefore referred to and to be maintained in a fixed position in respect thereto. The wheeled frame has on that end thereof opposite to the end to which the blowing mechanism is secured and on each side of its longitudinal axis, an up-standing skeleton frame 2 having a circular bearing 3 projecting from the top center thereof inwardly. On each of the bearings 3 is mounted a hub 4$^a$ of radius arm 4. As the several parts which are mounted on or coacting with the radius arms are in duplicate, one for each side of the frame and are similar, I will for convenience confine the following description to one set of them.

The outer end of the radius arm has a hub 4$^b$ in which is mounted a sleeve 5$^a$ on the projecting inner end of which is keyed the hub 5$^b$ on one end of an outer arm 5, the opposite end of which arm is formed into a hub 5$^c$ to support the blow-pipe receiving mechanism or chuck. The lower end 4$^c$ of the radius arm is continued downwardly and bent inwardly where it is formed into a segmental rack 6 located above a corresponding segmental rack 7 of greater radius carried by the skeleton frame, a pinion 8 being interposed between the two segmental racks and having a motion longitudinally of the machine imparted thereto by means of mechanism which will be hereinafter described, whereby the radius arm will be caused to swing in an arc of a circle around the radius arm bearing 3.

As before stated the outer arm 5 is keyed to one end of the sleeve 5$^a$ mounted in the upper end of the radius arm 4 and the opposite end of the said sleeve projects to the front of the radius arm and has keyed thereon a pinion 9 which meshes with a segmental rack 9$^a$ the ends 9$^b$ of which extend longitudinally of the machine and are carried by parallel links 10 pivoted to the skeleton frame symmetrically in respect to the axis of movement of the radius arm, a suitable curved guide 9$^c$ being carried by the outer face of the radius arm to maintain the rack in engagement with the said pinion. Owing to this construction the swing of the radius arm about its sleeve will be accompanied by a change in the meshing position of the actuating pinion 9 for the outer arm and its segmental rack, whereby as the radius arm is swung to either side of a vertical line, the outer arm will be given a further movement around its sleeve and swung in respect to the said radius arm, the relation between the radius arm and the outer arm in the extreme positions of the former being such that the latter is projected towards the furnace or towards the blowing machine according to whether the radius arm is to one or the other side of its vertical position.

The pinion 8 interposed between the two segmental racks 6 and 7 is mounted on the link 11 from a longitudinally movable slide 12 guided in brackets 12$^a$ from the inside of the skeleton frame and having motion imparted thereto by a stud 12$^b$ thereon engaging a cam track 13 in the periphery of the drum 14 constantly driven by mechanism to be hereinafter described and carried in bearings 14$^a$ in the skeleton frame. The track is so shaped that while parts of it 13$^b$, 13$^d$ and 13$^f$ extend spirally of the periphery of the drum, thereby imparting motion to the slide longitudinally of the base through the intervention of the pinion and segmental racks and a swinging motion to the radius arm 4 about its sleeve hub 3, portions 13$^a$, 13$^c$, and 13$^e$ of said track are located in planes at right angles to the axis of rotation of the cylinder, whereby periods of rest are obtained in the swinging motion of the radius arm, such positions of rest corresponding and being of proper extent to permit the gathering and marvering actions and to properly time the blow-pipe in respect to the blow apparatus. The swinging motions of the radius arm will as before described effect the swinging motion of the outer arm 5 around the upper ends of the radius arms and hence the instrumentalities before described effect a traversing motion of the blow-pipe chuck between the furnace and the blowing devices, such motion being accompanied by proper periods of rest.

The blow-pipe receiving mechanism consists of a cylindrical body 15 having a slot 15ª in its inner face in which is pivoted by a transverse pivot 15ᵇ, a pair of arms 16 each of which is provided with under-cut jaws 16ª. The blow-pipes C used with this machine have rigidly secured thereto a bevelled pinion 17 and adjacent to the pinion have collars 17ª between which and on the pipe is mounted a rotating sleeve 17ᵇ, one side of which is produced with a projection 17ᶜ as shown, the opposite ends of such projecting portions being notched as at 17ᵈ and provided with undercut shoulders 17ᵉ adapted to be engaged by the undercut jaws 16ª of the chuck arms. Sleeved on the chuck body 15 is the hub 18ᵈ of the bevelled gear 18, the hub carrying on its opposite and inner end, by a splined connection, a second gear 19, such last named gear being capable of movement axially of the chuck, and being provided with an annular recess 19ª in its inner face into which at diametrical opposite points projects fingers 16ᵇ on the ends of the chuck arms. Each chuck arm 16 has a corner 16ᶜ located on the opposite side of the axis of the chuck to its engaging jaw 16ª and projecting beyond the face of the chuck body, so that in inserting the blow-pipe into the chuck the face of the projection 17ᶜ of the sleeve of the latter will by contacting with the said corners 16ᶜ throw the jaws 16ª of the chuck arms towards the blow-pipe, thus engaging them with the undercut shoulders 17ᵉ of the sleeve 17ᵇ and will simultaneously project the gear 19 towards the pinion 17 on the blow-pipe and cause the two to mesh, the parts being firmly held in this position by the undercut jaws and faces.

Carried on the outer arm 5, which latter is inclined from its point of attachment with the radius arm 4 inwardly towards the center line of the machine, is a shaft 20, which at its lower end has a bevelled pinion 20ª meshing with the bevelled gear 18 sleeved upon the chuck body, and at its upper end a mitre gear 20ᵇ meshing with a corresponding pinion 20ᶜ upon the inner end of a cross shaft 20ᵈ passing through the sleeve 5ª of the outer arm to the outer face of such sleeve where it has keyed thereto a mitre gear 20ᵉ meshing with a corresponding mitre pinion 20ᶠ keyed to a shaft 20ᵍ carried upon the outer face of the radius arm 4 in suitable bearings, the lower end of such shaft having keyed thereon a mitre gear 20ʰ meshing with a corresponding pinion 20ⁱ carried upon the outer end of a cross shaft 20ᵏ projecting through the skeleton frame and centrally through the radius arm bearing sleeve 3. The shaft 20ᵏ has upon the inner end a sprocket wheel 20ᵐ to which motion is to be imparted by mechanism to be hereinafter described, whereby the blow-pipe will be rotated, through the pinions 17ᶜ and 19, around its longitudinal axis.

The chuck body 15 is provided with a stem 15ᶜ having a bearing in the hub 5ᶜ of the outer end of the outer arm, such stem carrying on the inner side of such hub a bevelled gear 21 meshing with a pinion 21ª on the lower end of a shaft 21ᵇ carried in bearing on the outer face of the arm 5, the upper end of said shaft having keyed thereto a bevelled gear 21ᶜ. A corresponding shaft 22ᵇ having on its upper end a bevelled pinion 22ᶜ and its lower end a bevelled gear 22ª is carried lengthwise of the radius arm by bearings on the inner face thereof and the pinion and gear 22ᶜ and 21ª upon the two shafts engage the opposite faces of a double beveled gear wheel 23 sleeved on and between the outer hub 4ᵇ of the radius arm of the inner hub 5ᵇ of the outer arm, so that rotation imparted to the shaft 22ᵇ upon the radius arm will be transmitted through the shaft 21ᵇ upon the outer arm to the chuck body thereby rotating the same upon its longitudinal axis and at the same time swinging the blow-pipe about the axis of said chuck. Mounted upon the radius arm sleeve 3 to the inside of the radius arm from which it is separated by a nut 3ª is a bevelled gear 24 meshing with the gear 22ª on the radius arm shaft, such gear having upon its hub a spur gear 24ª engaging with a rack 25 guided in bearing 25ª projecting from the inside of the skeleton frame and the hub. Motion is imparted to the rack 25 by a spur gear 26 mounted on the inner end of a transverse shaft 26ª, the outer end of such shaft having a spur gear 26ᵇ meshing with a rack upon a vertical slide 27 which carries a stud 27ª taking into a cam track 28 upon the end of the drum. The function of operation to be performed by this cam track will be hereinafter described. The lower end of the slide is bifurcated and is guided by the axle 14ᵇ of the drum and a guide 27ᶜ is provided for its upper end.

It has been stated that the blow-pipe traversing mechanism, the blow-pipe chucks and the actuating means therefor, as before described, are in duplicate, one of such mechanisms being placed on each side of the longitudinal center of the base frame, and they are so located that the blow-pipes carried by the several chucks will on movement of the chucks travel in the same vertical plane, which is the medial plane of the machine. Located in the base frame of the machine and in this medial plane between the skeleton frame and the blowing apparatus is the marverer consisting essentially of two cam shaped rollers 29 carried on the upper ends of shafts 29ª mounted in links 30 pivoted in the medial plane of the machine, such links being provided with appropriate mechanism 30ᵃ whereby the marvering rollers carried thereon may be caused to approach and recede from each other. The marvering rollers are driven by gears 29ᵇ on the shaft thereof meshing with idlers 29ᶜ mounted in the links, which in turn mesh with the pinion 29ᵈ mounted on the shaft 29ᵉ on which the links themselves are pivoted. This shaft is driven by an appropriate mechanism to be hereinafter referred to.

Mounted in the base frame of the machine to one side thereof is a suitable main drive 31 (shown in dotted lines in Fig. 1), such as an electric motor, the shaft 31ᵃ of which carries a worm 31ᵇ meshing with a worm 31ᶜ on the vertical driving shaft 29ᵉ of the marverer. The main shaft 31ᵃ of the motor further carries pinion 31ᵈ driven through an idler 31ᵉ, a pinion mounted on the lower transverse shaft 31ᶠ of the machine which latter shaft carries on each end a worm 31ᵍ, each of which engages a worm wheel 31ʰ fast upon the end of the actuating drum 14 of the corresponding arm whereby translating motion of the chuck is effected. Such transverse shaft moreover carries thereon on each side of its center a sprocket wheel 31ⁱ from each of which through the intervention of sprocket chains 31ᵉ motion is transmitted to the sprocket wheel 20ᵐ carried on the inner ends of the shaft 20ᵏ from which the blow-pipes are rotated.

I have hereinbefore stated the molding and blowing mechanism which is shown diagrammatically in Figure 1 is of the character shown in my other application, Serial Number 445,252, filed July 24, 1908, renewed on October 29, 1910, as Serial Number 589,786. As shown in Figure 15 of the present drawings (which figure is a copy of Figure 3 of the drawings in the last named case) such mechanism comprises a base D' supporting a vertical tubular standard D, in which is contained the vertical driving shaft E, driven through bevel gears F and F' and a clutch G by a motor H. The clutch G is of such a character that it releases itself after driving the shaft E through a complete revolution, and is adapted to be thrown into engagement to start the rotation of the shaft by means of a yoke g, formed upon the rearwardly extending end of a lever g' which is pivoted near its upper end on the standard, and whose upper end is bifurcated to receive the blow-pipe C, the weight of the blow-pipe when inserted therein actuating the clutch. A cam track H' is formed on the lower end of the vertical shaft, and in it a stud h, connected by links h' to the pivoted mold halves I, runs, the arrangement being such that with the shaft in its normal position the mold halves are open, and that during the rotation of the shaft they are closed and so held for a proper period before being opened.

On the upper end of the standard is the air head 1ᵃ, the air valve 1ᵇ of which is actuated at about the time the mold is closed, through the rotation of the shaft, to admit blowing air.

In the operation of the device an arm 5 being in the position shown in the left of Fig. 1, the radius arm 4 will by the rotation of the cam cylinder 14 be swung to the right about its sleeve 3 and in this movement the outer arm 5 will swing about its pivot on the outer end of the radius arm downwardly and toward the right, decreasing the angle between it and the radius arm. During this movement in order to clear the mouth of the furnace or the pot it is necessary in the construction shown that the gathering end of the blow-pipe be lifted by swinging the blow-pipe upon the axis of its chuck. This is effected by the stud on the vertical slide 27 at this time being lifted by the inclined portion 28ᵃ of the cam track 28 on the end of the cam cylinder 14. The continued rotation of the drum swings the radius arm and the outer arm from the position in which the blow-pipe will clear the pot or furnace to a position in which the blow-pipe chuck will be over the marverer, this being effected by the swinging of the radius arm around its sleeve and the swinging of the outer arm upon the radius arm. This will also be accompanied by a swinging of the blow-pipe in a vertical plane around the axis of the chuck so that at the time the chuck is above the marverer the gathering end of the blow-pipe will be hanging vertically from the chuck, which may be effected with a concentric run 28ᵇ of the track 28 by a proper proportioning of the gearings 24, 22ᵃ, 22ᶜ, 23, 21ᶜ, 21ᵃ, and 21. Having reached the marvering position referred to, the motion of the radius arm and the outer arm is arrested by reason of the fact that the stud 12ᵇ at this time is engaging the marvering run 13ᶜ of the peripheral groove of the cylinder, the marvering rollers being so timed in respect to the arm that at the time the glass upon the blow-pipe is presented between them, their surfaces are separated to their maximum extent. During this time that the blow-iron is held stationary between the marvering rollers, the latter make one or more complete rotations, thus marvering the glass upon the end of the blow-iron. When the marverers have completed their full rotation and have released the glass (the radius arm and the outer arm being still stationary), the stud 27ᵃ works in the wave run 28ᶜ of the end cam track 28 upon the cylinder to rapidly oscillate or swing the blow-pipe in a vertical plane around the axis of the chuck, thus shaping the glass and finally the movement of the radius arm and outer arm are resumed by the cam run 13ᵈ and the chuck is positioned with respect to the blowing apparatus, the run 28ᵈ being so shaped that at this instant the blow-pipe is vertical and is stationary at this time. The motion of the radius arm and outer arm is also arrested by the fact that the actuating slide of the former is engaging the machine run 13ᵉ of the peripheral cylinder. During the time that the blow-pipe chuck is in the blowing position, the blowing machine, by mechanism, not necessary to be described here, removes the blow-pipe from the presented arm by pressing back the bevelled gear 19 on the chuck and the latter remains in this position while the chuck is being rotated towards the furnace, which is effected by the return run 13ᶠ of the peripheral cam, the chuck being rotated by the run 28ᵉ of the end cam. In swinging back towards the furnace the chuck from which the blow-pipe has been removed passes the blow-pipe carried by the other arm which is going toward the blowing machine, but as there is no blow-pipe at this time upon the arm travelling from the blowing machine they clear each other. After passage of the empty chuck past the loaded one an attendant inserts a blow-pipe into such empty chuck in the manner before described and by a continued movement of the radius arm and outer arm the blow-pipe is presented horizontally into the mouth of the furnace and then dropped by the inclined run 28ᶠ of the end cam therein to assume the position shown in the left of Fig. 1. It will be noted that this return movement of the arms from the blowing to the gathering position is uninterrupted and that when the blow-pipe has been properly presented into the furnace its translating movement is arrested by the actuating slide engaging the gathering run 13ᵃ of the peripheral cam track, while after the blow-pipe has been dropped into the glass such movement is arrested by its actuating stud engaging the concentric run 28ᵍ of the end cam.

As it is desirable at certain times, particularly in the gathering and marvering, that the blow-pipe have a rotation around its longitudinal axis, this motion is imparted to it by the gearing before described and for convenience of construction this rotation is uninterrupted.

Claims generic to the matter shown herein, and also shown in my other application No. 551,198, filed March 23rd, 1910, are made in such other application, and in divisions thereof, and the claims herein made are restricted to exclude subject-matter common to the said applications.

What I claim and desire to secure by Letters Patent is:—

1. In a glass working machine, the combination of two blow-pipe receiving devices, means for translating such blow-pipe devices with the blow-pipes thereon in the same vertical plane, a marverer located in the said plane and acting upon the glass on the blow-pipes carried on said devices.

2. In a glass working machine the combination of two blow-pipe receiving devices, means for translating such receiving devices in parallel, adjacent planes and a marverer adapted to act upon the glass on the blow-pipes carried by both of said blow-pipe receiving devices.

3. In a glass gathering machine, the combination with a radius arm and outer arm pivoted thereon, means for swinging the radius arms from side to side and means for varying the inclination of the two arms in respect to each other and a blow-pipe receiving device carried by the outer end of the last named arm.

4. In a glass gathering machine, the combination of a radius arm, means for intermittently moving said arm in a vertical plane, an outer arm pivoted on the said radius arm, and means for intermittently swinging the last named arm in respect to the radius arm and blow-pipe receiving mechanism carried by the last named arm.

5. In a glass gathering machine, the combination with a radius arm and outer arm pivoted thereon, means for swinging the radius arm from side to side and means for varying the inclination of the two arms in respect to each other, a blow-pipe receiving device carried by the outer end of the last named arm and means for rotating the blow-pipe receiving device around a horizontal axis.

6. In a glass gathering machine, the combination of a radius arm, means for intermittently moving said arm in a vertical plane, an outer arm pivoted on said radius arm, means for intermittently swinging the last named arm in respect to the radius arm, a blow-pipe receiving device carried by the last named arm and means for intermittently swinging the blow-pipe receiving mechanism around a horizontal axis.

7. In a glass gathering machine, the combination with a radius arm, an outer arm pivoted thereon, means for swinging the radius arm in a vertical plane and for thereby varying the angle between the two arms, and a blow-pipe receiving mechanism carried by the outer arm.

8. In a glass gathering machine, the combination with a radius arm, an outer arm pivoted thereon, means for intermittently swinging the radius arm in a vertical plane and for thereby intermittently swinging the outer arm upon the radius arm and the blow-pipe receiving mechanism on the outer end of said outer arm.

9. In a glass gathering and working machine, the combination with a radius arm, an outer arm pivoted thereon, means for intermittently swinging the radius arm in a vertical plane and for thereby intermittently swinging the outer arm upon the radius arm, a blow-pipe receiving mechanism on the outer end of said outer arm and means for intermittently swinging the blow-pipe mechanism on a horizontal axis.

10. A glass gathering and working machine, the combination with a radius arm, an outer arm pivoted thereto, a blow-pipe receiving mechanism carried by the last named arm, means for swinging the radius arm in a vertical plane and means including an arced shaped rack carried by parallel links and a pinion, for swinging the outer arm upon the radius arm.

11. In a glass gathering and working machine, the combination with a radius arm and outer arm pivoted thereon, means for swinging the radius arm from side to side and means for varying the inclination of the two arms in respect to each other, a blow-pipe receiving device carried by the outer end of the last named arm, and a marverer into operative relation with which the glass on the blow-pipe is brought by the movements of the arms.

12. In a glass gathering and working machine, the combination of a radius arm, means for intermittently moving said arm in a vertical plane, an outer arm pivoted on the said radius arm, means for intermittently swinging the last named arm in respect to the radius arm, blow-pipe receiving mechanism carried by the last named arm and a marverer into operative relation with which the glass on the blow-pipe is brought by the movement of the arms.

13. In a glass gathering and working machine, the combination with a radius arm and outer arm pivoted thereon, means for swinging the radius arm from side to side, means for varying the inclination of the two arms in respect to each other, a blow-pipe receiving device carried by the outer end of the last named arm, means for rotating the blow-pipe receiving device around a horizontal axis, and a marverer into operative relation with which the glass on the blow-pipe is brought by the movements of the arms.

14. In a glass gathering and working machine, the combination of a radius arm, means for intermittently moving said arm in a vertical plane, an outer arm pivoted on the said radius arm means for intermittently swinging the last named arm in respect to the radius arm, a blow-pipe receiving device carried by the last named arm, means for intermittently swinging the blow-pipe receiving mechanism around a horizontal plane, and a marverer into operative relation with which the glass on the blow-pipe is brought by the movements of the arms.

15. In a glass gathering and working machine, the combination with a radius arm, an outer arm pivoted thereon, means for swinging the radius arm in a vertical plane and for thereby varying the angle between the two arms, a blow-pipe receiving mechanism carried by the outer arm, and a marverer into operative relation with which the glass on the blow-pipe is brought by the movements of the arms.

16. In a glass gathering and working machine, the combination with a radius arm, an outer arm pivoted thereon, means for intermittently swinging the radius arm in a vertical plane and for thereby intermittently swinging the outer arm upon the radius arm, the blow-pipe receiving mechanism on the outer end of said outer arm and a marverer into operative relation with which the glass on the blow-pipe is brought by the movements of the arms.

17. In a glass gathering and working machine, the combination with a radius arm, an outer arm pivoted thereon, means for intermittently swinging the radius arm in a vertical plane and for thereby intermittently swinging the outer arm upon the radius arm, a blow-pipe receiving mechanism on the outer end of the outer arm, means for intermittently swinging the blow-pipe mechanism on a horizontal axis and a marverer into operative relation with which the glass on the blow-pipe is brought by the movements of the arms.

18. A glass gathering and working machine, the combination with a radius arm, an outer arm pivoted thereto, a blow-pipe receiving mechanism carried by the last named arm, means for swinging the radius arm in a vertical plane and means including an arced shaped rack carried by parallel links and a pinion, for swinging the outer arm upon the radius arm, and a marverer into operative relation with which the glass on the blow-pipe is brought by the movements of the arms.

19. In a glass gathering and working machine, the combination with means for gathering glass upon the end of the blow-pipe, of a marvering device consisting of a plurality of cam rollers, means for positively rotating the rollers, means for rotating a blow-pipe and introducing and removing it from between the rollers and means for blowing the glass marvered between the rollers.

20. In a glass gathering and working machine, the combination of blow-pipe receiving means adapted to present the blow-pipe to the furnace, a marvering device consisting of a plurality of cam shaped rollers, translating means for the blow-pipe receiving device adapted to present between the rollers the gathered glass, means for positively driving the rollers and the blow-pipe and means for moving the translating device so as to remove the blow-pipe from between the rollers.

21. In a glass gathering, marvering and blowing machine, the combination with a blow-pipe receiving device, of a marverer consisting of a plurality of cam shaped rollers positively driven means for translating the blow-pipe receiving device and holding it stationary at marvering and blowing positions, means for swinging the blow-pipe on a horizontal axis to present it vertically at the marvering and blowing positions and to incline it at the gathering position.

22. In a glass gathering, marvering and blowing machine, the combination with a blow-pipe receiving device, of a marverer consisting of a plurality of cam shaped positively driven rollers, means for translating the blow-pipe receiving device and for holding it stationary at marvering and blowing positions, means for swinging the blow-pipe on a horizontal axis to present it vertically at the marvering and blowing positions and to incline it at the gathering position.

23. In a machine of the class described, the combination with a glass-working spindle adapted to carry a mass of glass, a marverer having opposing faces, means for oscillating the spindle to present the glass thereon between the faces of the marverer, and means for moving the marverer whereby the opposing faces thereof at the points at which the glass contacts therewith are caused to approach the plane of oscillation of the spindle.

BENJAMIN D. CHAMBERLIN.